Patented July 14, 1925.

1,546,115

UNITED STATES PATENT OFFICE.

MILTON F. BEECHER, ABRAHAM ALBERT KLEIN, AND WALLACE W. GREENWOOD, OF WORCESTER, MASSACHUSETTS, ASSIGNORS TO NORTON COMPANY, OF WORCESTER, MASSACHUSETTS, A CORPORATION OF MASSACHUSETTS.

VITREOUS BONDED SILICON-CARBIDE ABRASIVE ARTICLE.

No Drawing.   Application filed February 16, 1920.   Serial No. 359,204.

*To all whom it may concern:*

Be it known that we, MILTON F. BEECHER, ABRAHAM ALBERT KLEIN, and WALLACE W. GREENWOOD, citizens of the United States of America, residing at Worcester, in the county of Worcester and State of Massachusetts, have invented certain new and useful Improvements in Vitreous Bonded Silicon-Carbide Abrasive Articles, of which the following is a full, clear, and exact specification.

Our invention relates to abrasive articles of silicon carbide grains bonded together by a ceramic material and to a process of making the same.

In the manufacture of grinding wheels, it has been found desirable to bond emery or artificial aluminous abrasives with clay materials which completely fuse at the temperature of firing, normally Seger cones 12 to 13, due to the fact that the fused mass makes a better contact with the grains than does a partially fused, vitrified bond. The fusible clay bond ordinarily used in such wheels may be fired at a temperature considerably higher than its actual fusing point without producing an overfired condition in the wheel. This temperature is permissible because the alumina does not dissociate but merely tends to unit with the bond material and form various compounds which produce a physical and a chemical union between the grains.

In the manufacture of abrasive articles from silicon carbide, however, the same principle has not heretofore been followed with the ordinary ceramic materials, as bonds, which are normally fired at about Seger cone 12. It is found that when the abrasive grain, mixed with a bond which is suitable for aluminous abrasives, is heated up to a sufficient temperature to fuse the bond and lower its viscosity to such an extent that it will surround and adhere to the silicon carbide grains, the latter have commenced to oxidize, or, if certain bond ingredients such as alkalis are present in sufficient amount, to dissociate, which prevents the bond from adhering to them, and an article results having a weak or vesicular structure, sometimes known as a cored or bloated product. Reaction may also occur between the silicon carbide and the clay bond at the firing temperature, which tends to destroy the cutting action of the abrasive and the strength of the bond.

It has accordingly been considered necessary to fire silicon carbide abrasive articles to such temperatures and to use such bond compositions that the latter are not carried beyond vitrescence or incipient fusion. For this reason, the ceramic bonding materials used have been selected with a view to obtaining a mixture of high melting point. Such bonds of the porcelainic type when matured to this degree do not develop the maximum holding power upon the abrasive particles and accordingly more bond must be used in order to provide the desired grade of hardness. Consequently, the abrasive article is more dense and not as free-cutting as is often desired.

It furthermore has been thought necessary to subject the mixture of abrasive and bond to high pressure and make a dense mass in which the grains are physically protected by the surrounding clay. This procedure has made it difficult to obtain an open, porous body which is often needed for particular grinding operations, requiring the maximum strength of wheel structure and the minimum quantity of bond.

It is accordingly an object of our invention to produce a better bonded silicon carbide abrasive article than heretofore obtained by utilizing low fusing clay materials which will form a homogeneous magma spreading uniformly over the silicon carbide grains and holding them firmly in place; and which will minimize any tendency toward the formation of a cored, bloated or similarly defective article for use as an abrasive tool.

It is also an object of our invention to produce a bonded abrasive article, containing silicon carbide and a ceramic material having a low fusing point, in which the abrasive grains are held more tenaciously in place than in wheels having the same weight of porcelainic bond heretofore employed, or which, for the same degree of grade hardness, will require less bond and have a more open structure and be cooler cutting than silicon carbide abrasive wheels made of the porcelain types of bond.

With these and other objects in view as will be apparent from the following disclosure, our invention resides in the steps of a process and the product made thereby, as set forth in the specification and covered by the claims appended hereto.

In accordance with our invention we have found it feasible to bond silicon carbide with materials containing a low fusing ingredient and particularly such clay materials as will form a satisfactory bond when fired at a temperature so low as to avoid all possibility of developing a porous vesicular structure. While it is possible to utilize a single, low fusing material of desired characteristics, we prefer to employ a mixture of various ceramic materials, since we may thereby modify the plasticity and working properties as well as the fusibility of the bond to a desired extent. The bond ingredients are so selected and proportioned that the wheel may be fired at a heat treatment which will cause the bond to become substantially completely vitreous without developing an undesired wheel structure. For certain types of wheel we ordinarily prefer to utilize bonds which require heat treatment within the range corresponding to the softening points of Seger cones 5 and 10, while for other wheels, we may select bond mixtures which fuse at lower temperatures, it being noted that the heat treatment and the kind and proportions of bond materials selected depend upon what kind of pore structure, grade hardness and abrasive qualities are desired in the wheel, as well as upon the permissible reactions which take place within the fluid mass during the firing operation. Also, a bond fusing somewhat above this temperature range may be utilized without serious effects if the firing conditions are carefully controlled.

To this end, we may utilize a vitrifiable ceramic bond containing a fluxing agent adapted to lower the fusion point of the bond and form, at the firing temperature, a liquid of low viscosity which has the power of coating the abrasive grains completely, and preferably employ as such agent a clay of that type known as slip clay. A typical analysis of such a clay, ceramically termed Albany slip clay, is as follows:

| | |
|---|---|
| $SiO_2$ | 57.54 |
| $Al_2O_3$ | 13.85 |
| $Fe_2O_3$ | 6.02 |
| $CaO$ | 6.67 |
| $MgO$ | 3.78 |
| $K_2O$ | } 4.11 |
| $Na_2O$ | |
| Ignition loss | 8.77 |

To illustrate the use of such a clay with other ceramic materials, we may mix slip clay with porcelain types of bond and preferably utilize as a law fusing bond which will soften between Seger cones 5 and 10 clay, ball clay, flint and feldspar, within the range of the following proportions:

| | Parts by weight. |
|---|---|
| Ball clay | 20 to 60 |
| Feldspar | 20 to 40 |
| Flint | 0 to 20 |
| Slip clay | 20 to 45 |

As shown by the above table, the slip clay, when used in a minimum amount, constitutes about 8% by weight of the bond. A larger amount lowers the softening point of the mixture.

In order to provide this bond mixture with other desirable characteristics, we may substitute any suitable low fusing clay or a fluxing material, such as borax, for any portion of these ingredients. For one type of grinding wheel, we may bond silicon carbide grains of any suitable size with a mixture such as described, in the proportions of from 8% to 33% of bond.

As a specific example of a grinding wheel or similar abrasive article made in accordance with this invention, we may select as our bond mixture, adapted to be fired not higher than cone 5, substantially equal percentages of slip clay, ball clay and feldspar, to which is added silicon carbide grain in the ratio of 15% of bond to 85% abrasive. After the mass has been wetted with water or other suitable agency to develop its plasticity and workable properties, it is suitably shaped, dried, shaved to desired dimensions, or otherwise treated as is well known in this art, and then fired in a ceramic kiln under suitable conditions, which may be non-reducing, to a temperature or heat treatment approximating that of Seger cone 5. It is to be noted that the condition of the bond depends upon both the temperature and the length of time during which the article is fired. Also, while the firing operation is carried on according to the usual ceramic practice, we control the heat treatment more carefully than considered necessary for firing porcelain bonds, in order to produce the best results.

By lowering the temperature of firing and utilizing a clay bonding material which will fuse to a fluid condition under the desired heat treatment, and otherwise carrying out the process described, we produce an article in which the silicon carbide grains are evenly and substantially completely coated with and protected by a non-reactive vitreous clay mass, and which is substantially free from products resulting from dissociation of the silicon carbide or reduction of the various ingredients of the article. The article does not possess a nodulary structure but is so uniform in appearance that, to the naked eye, drops, lumps or thick films of bond are not distinguishable on or among the abrasive grains. By reason of the greater fusibility and the lower viscosity of this clay material, the quartz grains originally introduced into the mass are substantially completely dissolved, and there is a marked reaction between the abrasive and the bond with the resulting formation of relatively large crystals of sillimanite. Moreover, to produce an article of a given grade of hardness, it is now feasible to utilize a smaller amount of bond mixture than heretofore considered possible, thus forming a more porous and open structure, which is particularly desirable in grinding wheels. Conversely, by employing the same weight of bond as that of the porcelainic mixture formerly used, the wheel comes from process one or two grades harder than heretofore obtainable. We also find that the pores are more even in size than in wheels made according to the prior practice, and that these pores are located between webs of bond joining adjacent abrasive grains and not within the body of the bond itself. By utilizing a bond which may be fired at low temperatures, ordinarily ranging between Seger cones 5 and 10, we effect not only a saving in the cost of kiln operation but render it impossible for the carbide to be materially affected by the fused bond at the temperature of firing. The bonds specified, owing their having desirable plastic and buoyant properties, render it easy to work the mixture and shape it without the use of a press.

Having described our invention, what we claim as new and desire to secure by Letters Patent is:

1. The method of forming a vitrified abrasive article comprising the steps of mixing silicon carbide grains with a protective, vitrifiable plastic ceramic bond of low reactivity which is capable of being completely fused to a glassy condition at Seger cone 10, shaping the mass and firing it under a heat treatment which fuses the bond without causing material dissociation of the silicon carbide and coats the grains uniformly, thereby uniting them into a unitary structure.

2. The method of forming an abrasive article comprising the steps of mixing silicon carbide grains with a vitrifiable bond proportioned to form a porous structure, which contains a clay of high plasticity and a flux capable of forming a liquid of low viscosity at Seger cone 10, without reacting detrimentally with the silicon carbide, shaping an article therefrom and firing it below cone 10 under a controlled heat treatment to fuse the bond and coat the grains uniformly without forming a nodulary or vesicular structure.

3. The method of making an abrasive article comprising mixing silicon carbide grains with a bond forming from 8 to 33% by weight of the total mass and having the following ingredients within the limits of the proportions specified:

|  | Parts by weight |
|---|---|
| Ball clay | 20 to 60 |
| Slip clay | 20 to 45 |
| Feldspar | 20 to 40 |
| Flint | 0 to 20 |

Water to develop the desired degree of plasticity, thereafter shaping and drying the article, and firing it to fuse the bond to a liquid of low viscosity which coats the grains uniformly while maintaining a temperature control which prevents the formation of a nodulary or vesicular structure.

4. An abrasive article comprising silicon carbide grains bonded and coated by a completely fused, vitrified clay bonding material which fuses below Seger cone 10, said article being highly porous and substantially free from dissociated silicon carbide products and having a closely adherent bond which coats the grains uniformly.

5. An abrasive article comprising silicon carbide grains and a vitreous ceramic bonding material, which, when fired, is substantially a glass containing sillimanite needles and no undissolved quartz, and which is fusible below cone 10.

6. An abrasive article comprising silicon carbide grains integrally united into a unitary structure and coated by a closely adherent, non reacting, vitrified clay bond, which constitutes from 8 to 33% of the total mass and may be completely fused to a liquid of low viscosity below Seger cone 10, and which has not formed a nodulary, vesicular structure.

7. An abrasive article comprising the product resulting from firing a composition of the ingredients set forth and within the proportions defined below, said composition having been heat treated below Seger cone 10 to fuse the bond to a liquid of low viscosity which coats the grains uniformly, and the heat treatment having been regulated to prevent the formation of a nodulary or vesicular structure:

|  | Parts by weight |
|---|---|
| Ball clay | 20 to 60 |
| Slip clay | 20 to 45 |
| Feldspar | 20 to 40 |
| Flint | 0 to 20 |
| Silicon carbide grains | 92 to 120 |

67% of the total mass.

Signed at Worcester, Massachusetts, this 12th day of Feb. 1920.

MILTON F. BEECHER.
A. ALBERT KLEIN.
WALLACE W. GREENWOOD.